Feb. 8, 1944.  E. T. TODD  2,341,165
COOLING SYSTEM
Filed Dec. 9, 1942  2 Sheets-Sheet 1
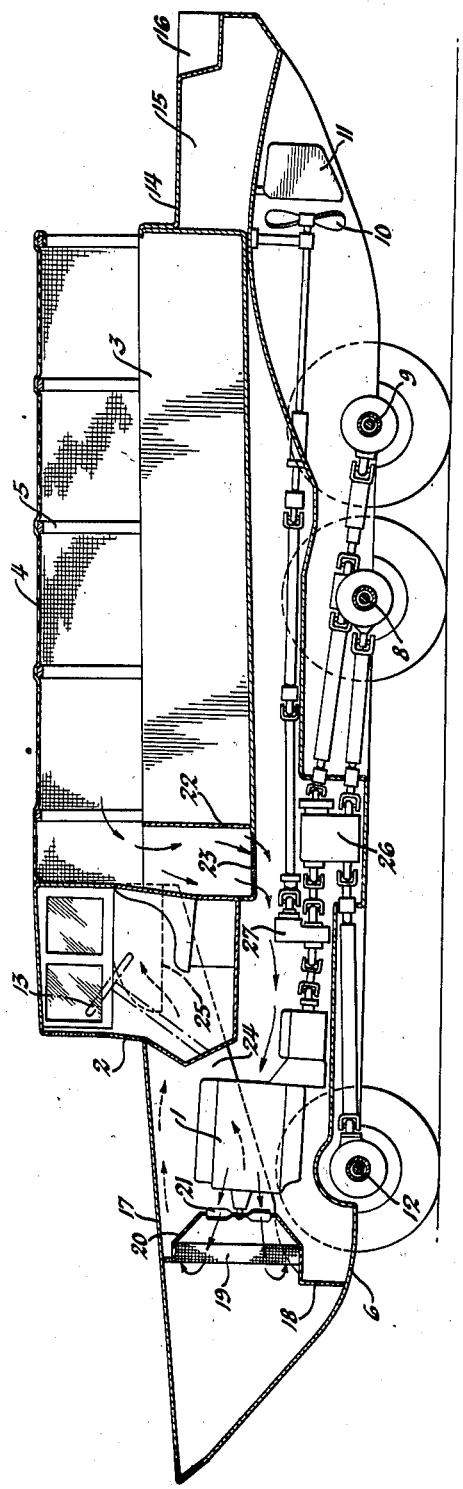
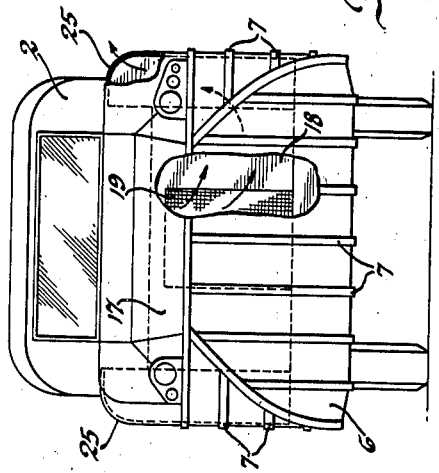
Inventor
Edwin T. Todd
By
Attorneys

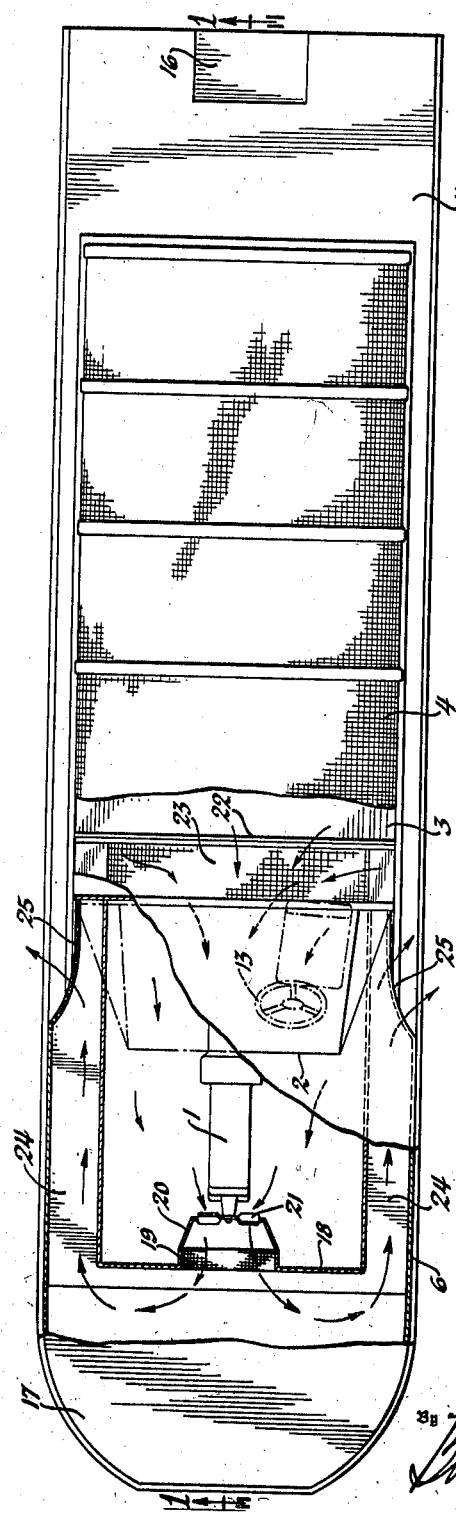

Patented Feb. 8, 1944

2,341,165

UNITED STATES PATENT OFFICE 2,341,165

COOLING SYSTEM

Edwin Thayer Todd, Pontiac, Mich., assignor, by mesne assignments, to General Motors Corporation, Detroit, Mich., a corporation of Delaware Application December 9, 1942, Serial No. 468,371

7 Claims. (Cl. 115—1)

This invention relates to amphibian vehicles and more particularly to an improved cooling system for the engine of a power conveyance intended for operation on either land or water.

The vehicle structure to which the invention may be applied will be herein illustrated as being essentially very much like a conventional six wheel cargo body truck. In such vehicle the chassis frame is spring supported on drive axles and has mounted thereon an engine over the front steering wheels and an operator cab behind the engine and a large load carrying body over the tandem axle rear bogie. There is merely added a watertight shell or hull fastened under the chassis frame to enclose the superstructure with drive shafts, for the axles and bladed boat propeller, extended through sealed openings in the hull bottom. Operation of the vehicle can be either on land or in the water and go from one to the other at any shore having a sloping bed on which the wheels can run to and from the water depth at which buoyancy occurs.

For both their land and water operation there is employed, as in the usual land vehicle, a water circulating system for cooling the engine, including an air cooled radiator in which engine heat is dissipated. Whereas in the conventional land vehicle the radiator is exposed at the front and is cooled by an air column passing therethrough by impact on its front face upon forward travel and by the suction of an engine driven fan behind its rear face and then moving over the engine for discharge beneath the vehicle, in a combined land and water vehicle having a hull enclosing the bottom and sides the usual cooling air path is blocked, especially if the construction is such that the hull rides low in the water with a water level line at approximately the height of the body floor and with the engine and radiator at least partially below the water line. The intake of air at the bow ahead of the radiator has been found impractical because the forward deck must be kept low and clear of obstructions to forward vision from the driver's cab and must also be kept substantially watertight because the overwash and dip in heavy sea would otherwise flood the hull or overwork the bilge pumps. Large openings for the intake and exhaust of cooling air in quantity required, must be located to minimize the likelihood of admitting water into the hull.

With the foregoing in mind it is here proposed to reverse the usual direction of the air column and to admit air from the interior of the body to the rear of the engine compartment. After passing over the engine and being blown by the engine fan forward through the radiator the air with its absorbed heat is directed through ducts at each side of the engine compartment and rearwardly along the cooler sides of the hull and is blown upwardly and outwardly from the vehicle through discharge openings near the top of the hull above the water level line and near the pitch center. The outlet for the engine exhaust of products of combustion may similarly be located so that in each case exhaust gases, heated air and engine fumes may be blown away from the body and driver's cab. The velocity of discharge assists in diverting splashings and the optional use of a screen or grating over the discharge openings will also be of help.

The improved cooling system will be better understood upon reference to the accompanying drawings wherein Figure 1 is a vertical longitudinal sectional view of a vehicle embodying the invention and Figures 2 and 3 are a front elevation and a top plan view, respectively, each having parts broken away.

For the sake of simplicity the drawings omit detail showings of some of the structure which is conventional in motor car practice, such as the control mechanism and the chassis frame which is spring supported on the axles. It will be understood that the chassis frame has mounted thereon the usual power plant indicated at 1, the driver's cab 2 and a cargo body 3. The load space over the body may be enclosed by a tarpaulin cover 4 spread over the usual cross bows 5 removably carried by the side walls of the body. The bulk of the superstructure is boxed within a watertight hull 6 whose bottom extends below and is suspended from the underside of the chassis frame above the ground line. The bottom and side exterior surfaces of the hull carry a number of spaced longitudinally extending ribs 7—7 which constitute rub rails and stiffeners. The bottom of the hull terminates at opposite ends in upwardly inclined end walls, which as seen in Figure 1 are arranged substantially tangential to the front and rear land wheels. This contour provides nose and tail skid ramps which assist in negotiating irregular ground surface and also provides some slip-stream effect for water travel. The underside of the hull over the drive axles 8 and 9 of the rear axle bogie and rearward to the stern is centrally humped to afford a water tunnel in which is positioned the bladed propeller 10 and steering rudder 11. This rudder as well as the steering linkage for the wheels of the front axle 12 are interconnected to the steering mechanism including the steering hand wheel 13 in the driver's cab 2. Above the rudder and beyond the cargo body 3 the stern of the hull has an upper deck plate 14 enclosing a storage compartment 15 which may contain the fuel tank, repair tools and other appurtenances. Usual spare wheels can be mounted on the top face of the rear deck 14. A central depression indicated at 16 in the rear deck gives a pocket for a winch or cable winding drum.

Ahead of the control cab the hull which encloses the engine compartment has a watertight forward deck 17 inclined downwardly and forwardly from the driver's cab for clear visibility. Forward of the engine compartment the space within the hull is divided by a partition 18 extending transversely and containing a central opening aligned with the engine cooling radiator 19. A radiator shroud 20 projects rearwardly around the engine driven fan 21 which serves to blow air forwardly through the radiator. The path of the air column is indicated by arrows in the drawing and it will be noted that the intake of air into the engine compartment is from the interior of the body immediately behind the driver's cab. To establish a forward limit to the loading space a transverse wall 22 extends upwardly from the floor of the body 3 in rearwardly spaced relation to the rear wall of the cab 2 and defines therebetween a passage for air entrance downwardly and under the floor of the cab. As a safety precaution an open grille or foraminous wall 23 is laid across the passage from the wall 22 to the adjacent wall of the cab, preferably at floor level. The air after having moved into the engine compartment and then being blown forwardly through the radiator enters the bow compartment ahead of the partition 18 and gives up at least some of its heat to the wall of the hull which in turn is cooled by surrounding air or water as the case may be. Leading rearwardly from the bow compartment and on each side of the engine compartment are the rearwardly and upwardly extending exhaust ducts 24—24. In each case one side wall of the duct may be constituted by the hull side wall. Each exhaust duct leads to a discharge outlet located toward the longitudinal center of the vehicle which is least affected by hull pitch in marine operation. Both outlets are above the loaded water level line and near the top of the hull and may be covered by foraminous screens or grilles 25. The direction of the exhaust is generally rearwardly, outwardly and upwardly so that the heated air is directed away from the body and especially the operator's cab.

For land operation the engine which has the usual clutch and change speed transmission drives through a power divider or transfer case 26 having propeller shafts leading to the several drive axles. For marine operation the propeller 10 is driven by a sectional propeller shaft from a power takeoff box 27 which enables the engine selectively to be coupled to either the propeller 10 or the driving road wheels. It will be noted that the several propeller shafts extend through the bottom of the hull and suitable packing boxes are employed in each instance for sealing against the entrance of water. The power propulsion mechanism and controls are conventional and well known. Both the steering rudder and the steering land wheels are operatively connected at all times with the steering gear and hand wheel. In the water the adjustment of the submerged front land wheels about their vertical king pins gives a rudder like action to supplement the rear rudder for a short turning radius and increased maneuverability.

I claim:

1. In an amphibian vehicle, a hull, a load deck within the hull above the bottom thereof with an operator station at the front of said deck, an engine compartment forward of the operator station, an air cooled radiator positioned over an opening in the engine compartment wall as a part of an engine cooling system, a fan for forcing cooling air through the radiator from the engine compartment, means to admit air to the engine compartment from above the floor of the deck behind the operator station, an air discharge duct leading rearwardly from ahead of the radiator and an outlet for said discharge duct located near the top of the hull above the loaded water line level for the ejection of heat absorbed air rearwardly of the forward limit of the operator station.

2. In a conveyance of the character described, land wheels mounted on front and rear axles, superstructure including in longitudinal succession above the axles, an engine, a driver station and a cargo body, a watertight hull enclosing the underside of the superstructure for floating the same in marine operation, a partition in the hull forward of the engine, an air exhaust duct leading from the space ahead of the partition to an outlet discharging above the water level and away from the driver station, means to pass cooling air under the driver station and over the engine, an engine cooling radiator in the path of said air and means to force the flow of air through said radiator and into the space ahead of said partition for exhaust through beforementioned duct.

3. In a conveyance of the character described, a hull, a partition dividing the interior of the nose of the hull into a forward compartment and an engine compartment rearwardly thereof, a load carrying body in the upper part of the hull behind the engine compartment, means to pass cooling air from the body interior to the engine compartment, a fan to move the air over the engine and into the forward compartment and an exhaust duct leading rearwardly beside the engine compartment from the forward compartment to an outlet above the water level line at the side of the hull rearwardly of the engine compartment.

4. In a conveyance, a forward engine compartment containing an engine and an engine cooling radiator having its air discharge face arranged for ejecting air through an opening in the wall of the compartment, a rearward load carrying body, a control cab positioned between the body and the engine compartment with its rear wall spaced from the forward limit of body loading space to define an air flow path leading under the cab and into the engine compartment and draft producing means to move a column of air through said path.

5. In a conveyance of the character described, a hull, an engine compartment forward in the hull, a control station rearward of the engine compartment, means to pass cooling air under the floor of the control station to the engine compartment and an air exhaust duct leading rearwardly from the front of the engine compartment to an outlet at the side of the hull above the water level line and rearwardly of the forward engine compartment.

6. In a conveyance of the character described, a hull, a control cab within the hull, an engine compartment forward of the cab, means to exhaust air from the front of the engine compartment and discharge it away from the cab at the side of the hull above the water line, and a cargo body within the hull rearward of the cab with its front wall spaced from the rear wall of the cab to define an air entrance passage leading downwardly and under the floor of the cab into the engine compartment.

7. In a conveyance of the character described, a fluid tight hull, a forward fluid tight deck cooperating with the hull to afford an engine compartment within the bow completely enclosed against entrance and discharge of cooling air except at the rear of the bow, an inlet passage leading from the rear of the bow to direct engine cooling air forwardly into the enclosed bow and a discharge passage leading from ahead of the engine to rearwardly beyond the bow.

E. THAYER TODD.